(12) United States Patent
Virtanen

(10) Patent No.: US 6,298,757 B1
(45) Date of Patent: Oct. 9, 2001

(54) SYSTEM FOR PRESETTING THE CUTTING TOOLS OF A CUT-OFF MACHINE FOR A PIPE OR A SHAFT

(75) Inventor: Jari Virtanen, Laihia (FI)

(73) Assignee: T-Drill Oy, Laihia (FI)

( * ) Notice: Subject to any disclaimer, the term of this patent is extended or adjusted under 35 U.S.C. 154(b) by 0 days.

(21) Appl. No.: 09/553,133

(22) Filed: Apr. 19, 2000

(30) Foreign Application Priority Data

Apr. 19, 1999 (FI) .......................................... 990871

(51) Int. Cl.[7] ........................................................ B23B 1/00
(52) U.S. Cl. .................................. 82/1.11; 82/47; 82/113; 82/131
(58) Field of Search ................................. 82/1.11, 46, 47, 82/48, 53.1, 54, 55, 56, 58, 61, 57, 70.2, 76, 84, 92, 100, 113, 128, 131

(56) References Cited

U.S. PATENT DOCUMENTS

| | | | |
|---|---|---|---|
| 3,662,633 | * 5/1972 | Bourgeois | 82/101 |
| 4,126,064 | * 11/1978 | Tarrant | 82/1.11 |
| 4,302,958 | * 12/1981 | Andriessen et al. | 82/56 X |
| 4,665,782 | * 5/1987 | Vander Pol | 82/113 |
| 5,014,579 | * 5/1991 | Galonska | 82/47 |
| 5,894,771 | * 4/1999 | Braun et al. | 82/47 |

\* cited by examiner

Primary Examiner—Henry Tsai
(74) Attorney, Agent, or Firm—Klauber & Jackson

(57) ABSTRACT

The invention relates to a system for presetting the cutting tools of a cut-off machine for a pipe or a shaft. A cutting tool cassette associated with a rotatable cutting head is removed from the cutting head and mounted and aligned on a separate presetting frame, which is provided with fixing and centering unit for a pipe or a shaft, and with a reference surface which has a predetermined position relative to the position of a tool present in the cutting head and operating a cutting wheel. The cassette placed on the presetting frame has its adjusting device adjusted by means of the reference surface in such a way that the cutting wheel is set at a desired initial machining distance from the surface of the pipe or shaft.

3 Claims, 2 Drawing Sheets

SYSTEM FOR PRESETTING THE CUTTING TOOLS OF A CUT-OFF MACHINE FOR A PIPE OR A SHAFT

BACKGROUND OF THE INVENTION

1. Field of Invention

The present invention relates to a system for presetting the cutting tools of a shaft.

2. Description of the Related Art

In the art of pipe cut-off machines, wherein the cutting is performed without chip removal, the cutting wheel and a calendar roll opposite thereto must be set at a desired initial spacing for machining, whenever the pipe or shaft diameter changes. In a prior art known cut-off machine, the adjustment or setting must be performed while the cassette is secured to the machine and the machine is shut down. The setting is a comparatively labor intensive and tedious process and the site of a setting procedure within the machine is not readily accessible.

SUMMARY OF THE INVENTION

It is an object of the invention to provide an improved system and method, whereby the tools in a quick-change cutting tool cassette can be preset outside a machine while, at the same time, the cut-off machine may have another cutting tool cassette mounted thereon, such that the cut-off machine can be in operation while the presetting of the cutting tools of another cassette is in progress.

This object is achieved by the presently claimed invention, wherein a system for presetting the cutting tools of a cut-off machine for a pipe or shaft comprises:

- a cutting tool cassette provided with coupling and aligning means for securing the cassette to a rotatable cutting head, having a center axis of rotation (I) which coincides with the center axis of a pipe or a shaft to be cut;
- at least one sharp-edged cutting wheel, which functions as a non-chipping cutter;
- a cutting wheel clamp, to which the cutting wheel is rotatably journal and which clamp is guided along maneuvering tracks for the cassette to travel (an arrow II) away from said center axis (I) in response to a centrifugal force and spring-back factor as the cutting head, along with the cassette mounted thereon, are rotating;
- an adjusting device associated with the clamp for setting the operating range of the cutting wheel to comply with the diameter of a pipe or shaft to be cut by adjusting a radial distance (III) of the adjusting device from the cutting wheel clamp, the adjusting device being provided with a bevelled guide surface which forms an acute angle with said center axis (I); and
- a power unit associated with the cutting head, which comes to contact with said bevelled guide surface of the adjusting device and carries the cutting wheel, along with its clamp, toward said center axis (I) in opposition to said centrifugal force and springback factor until the cutting wheel arrives at a radial distance from said center axis (I) as set by the adjusting device.

The invention relates also to a method for carrying out said presetting.

BRIEF DESCRIPTION OF THE DRAWINGS

One exemplary embodiment of the invention will now be described in more detail with reference made to the accompanying drawings, in which.

DETAILED DESCRIPTION OF THE PREFERRED EMBODIMENTS

Figure 1:
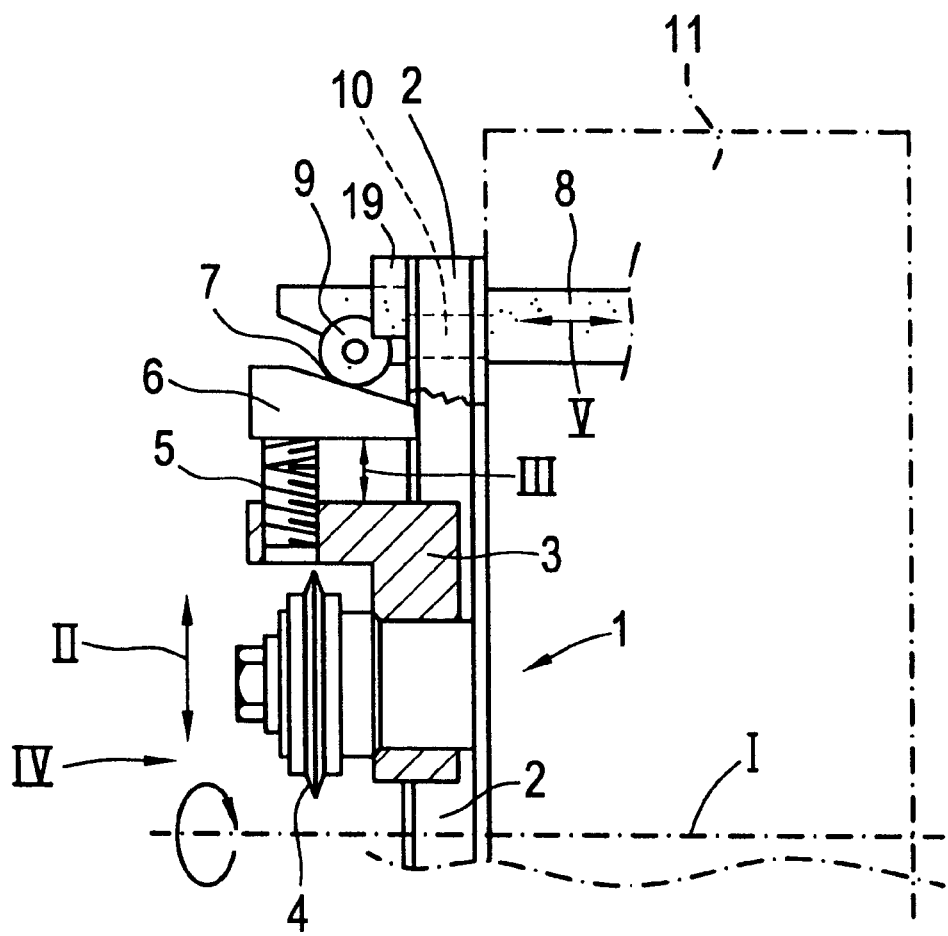
FIG. 1 shows one symmetrical half of a cutting tool cassette in a partial section, with a rotatable cutting head 11 shown only schematically.

Referring to FIG. 1, there is shown a cutting tool cassette 1 mounted on a rotatable cutting head 11 in a cut-off machine. The actual cutting is performed in a non-chipping fashion as the sharp edge of a cutting wheel 4 is pressed against the surface of a pipe or a shaft, while the cutting head 11, along with the cassette 1 mounted thereon, are rotating around a center axis I of the pipe of shaft. The cutting wheel 4 is journalled rotatably to a clamp 3, which is guided along maneuvering tracks 2 to move away from the center axis 2 in response to a centrifugal force and springback factor (Springs 20 in FIG. 3) as the cutting head 11 is rotating. This outward movement stops as a bevelled surface 7 included in an adjusting element 6 fastened to the clamp 3 by means of an adjusting screw 5 collides with a roller 9. The roller 9, on the other hand, is connected by way of a rod 8 with a power unit (not shown) included in the cutting head 11, whereby the rod 8 can be worked back and forth in the direction of an arrow V. As the rod 8 is pushed to the left in FIG. 1, the clamp 3 is urged toward the axis I by the roll 9 through the intermediary of the bevelled surface 7, whereby the cutting wheel 4 sinks its cutting edge inside a pipe or shaft, yet without carrying the cutting process all the way through. The final cutting is performed by axial pulling. In some cases, it is also possible to effect a cut-through by means of the cutting edge of the cutting wheel 4.

Figure 2:
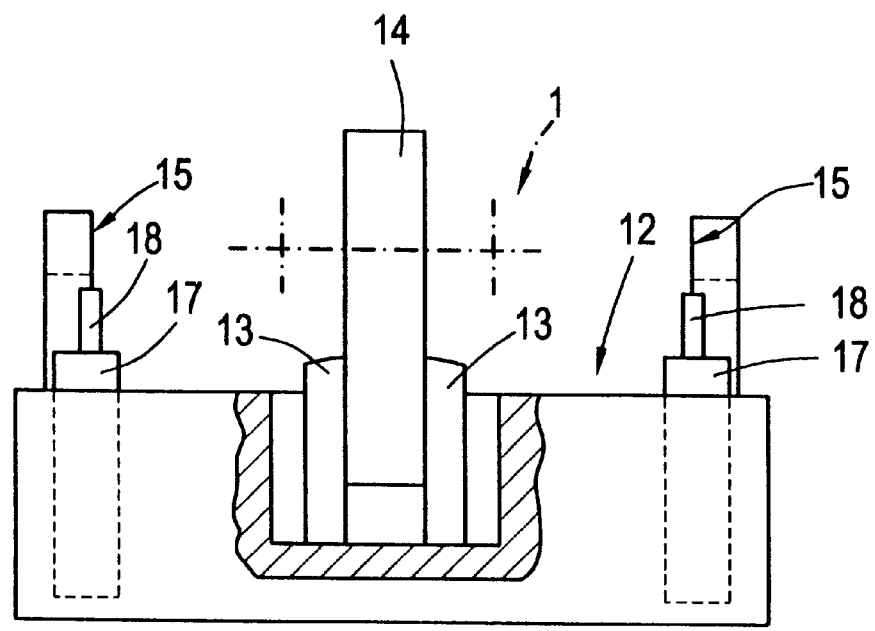
FIG. 2 shows a presetting frame 12 separate from a cut-off machine.

It is a distance from the surface 7 to the cutting wheel 4 which determines a starting position for the cutting wheel 4, and the wheel 4 has its cutting depth determined by the operating range of the rod 8. Adjustment of the wheel 4 regarding its starting position according to the diameter of a pipe or a shaft is effected by means of an adjusting screw 5 with a two-handed thread, the turning of which can be used for changing a distance III between the clamp 3 and the adjusting element 6. In order not having to carry out this adjustment inside a machine as the machine is shut down, the cutting tool cassette 1 is designed for a quick change and for presetting on a separate presetting frame 12, which is shown in FIGS. 2 and 3.

Between the cassette 1 and the cutting head 11 there may be any prior known quick-release locking system, which in the illustrated case is represented by holes 10 present in the ends of the maneuvering tracks 2. In a simple case, the coupling can be effected by means of screws or prongs fitting in the holes 10, the ends of which may be provided with holes for cotter bolts or which may be provided with spring-loaded lugs for the matching shapes of the holes 10.

The presetting frame 12 is provided with upright prongs 18 mounted on supports 17, which are dimensioned and positioned to fit in the holes 10 of the cassette 1, whereby the alignment of a cassette on the frame 12 is consistent with the alignment in the cutting head 11. The prong-hole assembly 18/10 is only described as one possibility, and it is natural that a skilled person can readily come up with any designs with regard to the frame 12 and the cassette 1 for placing the cassette 1 in a desired position relative to reference surfaces 15. The frame 12 is provided with fixing and centering means 13 for a pipe or a shaft 14, and with reference surfaces 15 whose positions relative to the adjusting device 5, 6 are consistent with positions assumed by the rod 8 and the roller 9 of the cutting head 11. Thus, the adjusting device 5, 6 for the cassette 1 properly aligned on the frame 12 is adjustable in such a way that the cutting wheel 4 settles at a desired starting distance from the surface of the pipe or shaft. The adjustment is effected simply by using a tool 16 to turn the adjusting screw 5 until the adjusting element 6 has its surface responding to the reference surface 15 and the wheel 4 has its cutting edge settled at a desired distance from the surface of the pipe or shaft 14. It is easy to carry out the adjustments on the presetting frame 12 and it is easy to observe a proper distance of the wheel 4 from the pipe or shaft 14. While the adjustment is in progress, the cut-off machine can be operated by using another preset cassette 1 mounted on the cutting head 11.

Figure 3:
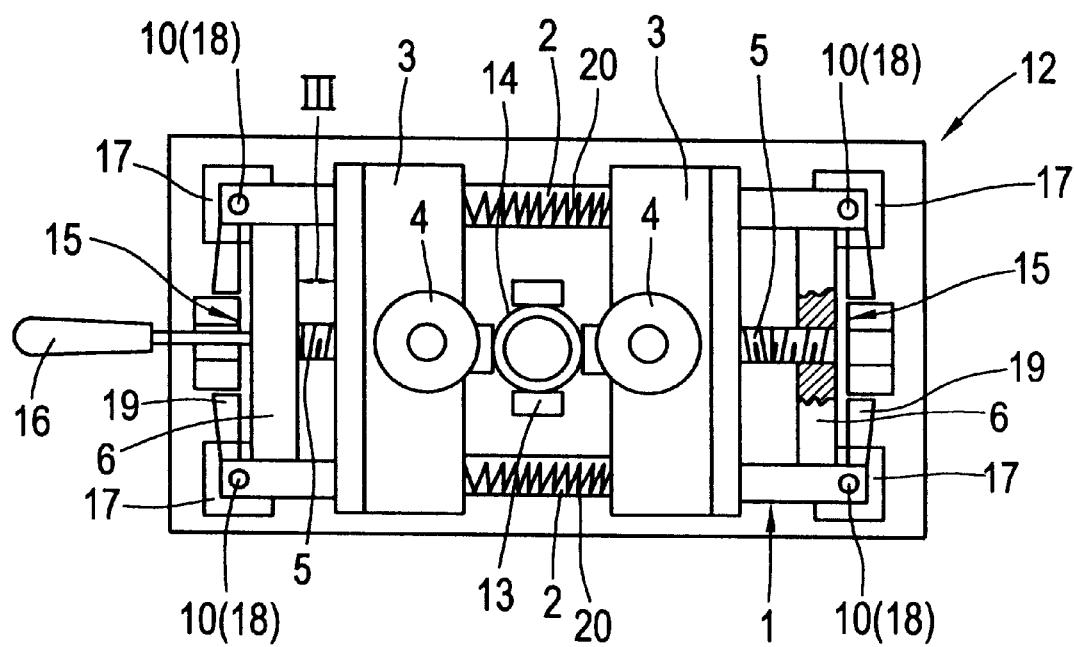
FIG. 3 shows in a plan view a condition, wherein a cutting tool cassette 1 is placed on the presetting frame 12 for the presetting of cutting tools 4.

In FIG. 1, reference character IV indicates a viewing direction in which the cassette 1 is visible in FIG. 3. As shown in FIG. 3, opposite to the first cutting wheel 4 the cassette 1 is provided with a second cutting wheel 4 or a calender roll for mangling the material displaced by the cutting wheel 4 to what is as close as possible to the original pipe diameter. The second cutting wheel 4 or calender roll is provided with a clamp 3 and an adjusting device 5, 6, which are structurally and functionally essentially identical to the clamp 3 and the adjusting device 5, 6 of the first cutting wheel 4. Thus, both cutting wheels 4, or the cutting wheel 4 and the calender roll, can be individually preset at a desired initial machining distance. The condition that the cassette 1 is not present on the cutting head 11 or the frame 12 results in the surfaces 7 colliding with stoppers 19 and limiting the movement of the clamps 3 in response to the propulsion by the springs 20.

The adjusting screw 5 has a thread which is two-handed and, thus, the turning thereof causes the elements 3 and 6 to move toward or away from each other, depending on which way the screw 5 is turned. The necessary adjusting range is short, typically in the order of a few millimeters (max. e.g. 12 mm), depending on the difference between the minimum and maximum diameters of pipes or shafts to be cut by means of the cut-off machine.

What is claimed is:

1. A system for presetting cutting tools of a cut-off machine for a pipe or a shaft, said system comprising:

a cutting tool cassette having a center axis of rotation which coincides with a center axis of a pipe or shaft to be cut;

a rotatable cutting head secured to the cassette by a means for coupling and aligning;

non-chipping cutter means comprising at least one sharp-edged cutting wheel;

a cutting wheel clamp, wherein said non-chipping cutter means is rotatably journalled to said cutting wheel clamp;

maneuvering track means for guiding said cutting wheel clamp thereon in a direction away from said center axis in response to a centrifugal force and springback factor as the cutting head, along with the cassette mounted thereon, are rotating;

an adjusting device associated with said cutting wheel clamp for setting an operating range of the cutting wheel to correspond with a diameter of said pipe or shaft to be cut by adjusting a radial distance of the adjusting device from the cutting wheel clamp, said adjusting device including a bevelled guide surface which forms an acute angle with said center axis;

a power unit associated with the cutting head, said power unit contracting said bevelled guide surface of said adjusting device and carrying said cutting wheel and said cutting wheel clamp toward said center axis in opposition to said centrifugal force and springback factor until said cutting wheel arrives at a radial distance from said center axis as set by said adjusting device;

wherein said cassette is removable from said cutting head and mountable by said coupling and aligning means onto a separate presetting frame for said adjusting device that includes fixing and centering means for particular adjustment of said adjusting device while said cassette is mounted on the separate presetting frame to cut a particular size pipe or shaft when said cassette is subsequently secured to said rotatable cutting head; and said fixing and centering means includes a reference surface whose position in relation to the adjusting device is predetermined relative to a position assumed by the power unit of the cutting head so that said cutting wheel settles at a desired initial machining distance from the surface of the particular size pipe or shaft on the separate presetting frame.

2. A system set forth in claim 1, wherein said cutting wheel comprises a first cutting wheel, and said system further includes one of a second cutting wheel or a calendar roll having a second cutting wheel clamp and a second cutting wheel adjusting device, which are structurally and functionally symmetrical with respect to said cutting wheel clamp and said device of said first cutting wheel, and wherein both said first cutting wheel and said one of a second cutting wheel or calendar roll is individually presetable at said desired initial machining distance.

3. A method for presetting cutting tools of a cut-off machine for a pipe or shaft, comprising the steps of:

(a) removing a cutting tool cassette from a rotatable cutting head of a cut-off machine;

(b) mounting and aligning the cutting tool cassette on a presetting frame; wherein before or after Step (b);

(i) providing a pipe or shaft which is fixed and centered relative to the presetting frame, said pipe or shaft has a diameter which matches a diameter of a pipe or shaft to be cut by said cut-off machine;

(c) adjusting a distance from a cutting tool to a reference surface of the presetting frame by an adjustment device present in the cutting tool cassette so that the cutting tool is set at an initial desired cutting range from the pipe or shaft, fixed on the presetting frame; and (d) mounting the cutting tool cassette on the cutting head at a predetermined location.

\* \* \* \* \*